US010539413B2

(12) United States Patent
Minor et al.

(10) Patent No.: US 10,539,413 B2
(45) Date of Patent: Jan. 21, 2020

(54) LIVE RIDE HEIGHT MEASUREMENT

(71) Applicant: SNAP-ON, Incorporated, Conway, AR (US)

(72) Inventors: Bryan C. Minor, Conway, AR (US); Rodney Harrell, Greenbrier, AR (US); David A. Jackson, Point Roberts, WA (US); George M. Gill, Conway, AR (US); Brian K. Gray, Conway, AR (US)

(73) Assignee: SNAP-ON Incorporated, Kenosha, WI (US)

( * ) Notice: Subject to any disclaimer, the term of this patent is extended or adjusted under 35 U.S.C. 154(b) by 399 days.

(21) Appl. No.: 14/972,438

(22) Filed: Dec. 17, 2015

(65) Prior Publication Data
US 2016/0178359 A1 Jun. 23, 2016

Related U.S. Application Data

(60) Provisional application No. 62/093,159, filed on Dec. 17, 2014.

(51) Int. Cl.
G01B 11/275 (2006.01)
B60R 1/00 (2006.01)
(Continued)

(52) U.S. Cl.
CPC ............ *G01B 11/2755* (2013.01); *B60R 1/00* (2013.01); *G01B 11/14* (2013.01);
(Continued)

(58) Field of Classification Search
CPC .... G01B 5/0025; G01B 5/255; G01B 11/002; G01B 11/2755; G01B 2210/12;
(Continued)

(56) References Cited

U.S. PATENT DOCUMENTS 6,796,043 B2 * 9/2004 Jackson ............... G01B 5/0025
33/286
2003/0051356 A1 3/2003 Jackson
(Continued)

FOREIGN PATENT DOCUMENTS

| CN | 102564356 A | 7/2012 |
| EP | 2 072 012 A1 | 6/2009 |
| EP | 2 233 365 A2 | 9/2010 |

OTHER PUBLICATIONS

International Search Report and Written Opinion of the International Searching Authority dated Mar. 11, 2016 in PCT/US2015/066264.

(Continued)

*Primary Examiner* — Luke D Ratcliffe
(74) *Attorney, Agent, or Firm* — Miles & Stockbridge P.C.

(57) ABSTRACT

Methods and systems measure a vehicle body parameter; e.g., a wheel alignment parameter such as ride height. Embodiments include a system having a target attachable to a vehicle body, and an image sensor for viewing the target and capturing image data thereof. A processor processes the image data, determines an initial spatial position of the target based on the processed image data, compares the initial spatial position of the target with a reference position, and prompts a user to align the target to an adjusted spatial position when the initial spatial position differs from the reference position more than a threshold amount. The vehicle body parameter value is determined based on the target's adjusted spatial position. In certain embodiments, the adjusted spatial position differs from the reference position by a position error value, and the processor mathematically corrects the vehicle body parameter value based on the position error value.

20 Claims, 14 Drawing Sheets

(51) Int. Cl.
  *G01B 11/14*  (2006.01)
  *G06K 9/00*   (2006.01)
  *G07C 5/08*   (2006.01)
  *G06T 7/73*   (2017.01)

(52) U.S. Cl.
  CPC ............ *G06K 9/00671* (2013.01); *G06T 7/73* (2017.01); *G07C 5/08* (2013.01); *B60R 2300/30* (2013.01)

(58) Field of Classification Search
  CPC .......... G01B 2210/14; G01B 2210/143; G01B 2210/16; G01B 2210/20
  See application file for complete search history.

(56) References Cited

U.S. PATENT DOCUMENTS

| | | | | |
|---|---|---|---|---|
| 2008/0119978 | A1* | 5/2008 | Stieff ................. | G01B 11/2755 701/31.4 |
| 2010/0166255 | A1* | 7/2010 | Strege ................ | B66F 7/28 382/100 |
| 2012/0062906 | A1* | 3/2012 | Schwarz .............. | G01B 5/255 356/620 |

OTHER PUBLICATIONS

Extended European Search Report dated Jul. 11, 2018 for EP 15 87 1041.
Office Action dated May 30, 2018 for related Korean Application No. 10-2017-7015104.
Chinese Office Action dated Mar. 13, 2019 for Application No. 201580069132.2.

* cited by examiner

LIVE RIDE HEIGHT MEASUREMENT

TECHNICAL FIELD

Embodiments relate generally to systems and methods of measuring a parameter of a vehicle body during a wheel alignment procedure. Embodiments more particularly relate to measuring the ride height of a vehicle using a machine vision wheel alignment system. Additional embodiments optionally or alternatively relate to an optical target attachable to a vehicle body for measuring ride height.

BACKGROUND

Certain vehicles require that the vehicle body be a specific height above the ground to maintain proper handling and operation, as specified by the vehicle manufacturer. This height is referred to as the ride height of the vehicle. To maintain the proper ride height of the vehicle throughout its lifespan, the height is typically measured at the time of a wheel alignment.

A current technique for measuring ride height involves wheel alignment equipment referred to as machine vision aligners or "visual aligners." Visual aligners use optical targets attached to each vehicle wheel. The targets are imaged by cameras, and these individual images are used to calculate the vehicle wheel alignment angles. Such conventional visual aligners are described in U.S. Pat. Nos. 5,724,743; 5,809,658; 5,535,522; and 6,968,282, which are hereby incorporated by reference in their entirety.

Conventionally, a specific type of target is used to measure the ride height of a vehicle. It is referred to as a "TIP" target, and is shown in FIG. 1. It consists of an optical target 105 fixed to the end of a pointer rod 100. Target 105 has fiducial marks (not shown) on its surface, such as circles or other shapes, similar to conventional wheel targets used with visual aligners. The tip of the rod 100 is positioned by a user on specific points of a vehicle as specified by the visual aligner software. The aligner's cameras read the target 105's location and orientation, and this image is used by the software to determine the height of the vehicle off the ground. Any time the user wants to know how alignment adjustments have affected the height of the vehicle, they must repeat this procedure.

As more vehicles become dependent on their ride height to produce a proper wheel alignment, a need has arisen for a way of dynamically measuring the ride height while the wheel alignment is being performed. To effectively do this with a visual aligner system, targets are mounted on each of the four wheel wells of the vehicle. This allows a visual aligner to dynamically track and display to the user how the changes being made to the wheel alignment are affecting the ride height of the vehicle. The user is thereby able to adjust the vehicle alignment and maintain the OEM specified ride height with less redundancy and in less time.

A critical problem with this approach occurs when the user places the ride height target on the wheel well. It is difficult to have a reference to the correct point of measurement of the wheel well, because wheel wells have curves which make it difficult to index the bottom of them with the ride height target assembly. One solution is to put a level vial on the ride height target assembly, as described in U.S. Pat. No. 8,587,791. However, the aligner cannot confirm that the target is in fact level, so if the user is not careful, the aligner will measure the ride height incorrectly. Additionally, if the target should slip during the alignment procedure, or if it is not placed directly above the center of the wheels, it will not be at the correct place in the arc of the wheel well and the aligner will not give correct ride height measurements, because the aligner does not know the target is incorrectly placed.

A better solution is required to ensure the ride height target is mounted level, that the ride height target does not move or slip during the measurement process, and that the target is in the center of the wheel well directly above the center of the wheel.

SUMMARY

The present disclosure ensures a ride height target is mounted level on a vehicle, that the ride height target has not moved or slipped during the measurement process, and that the target is in the center of the wheel well directly above the center of the wheel, via feedback (GUI) from the aligner software. In this way it is easy for the user to install the ride height target correctly, and the user is notified of any potential errors throughout the measurement process.

One or more embodiments can include a method for measuring a parameter of a vehicle body, the method comprising attaching an optical target to the vehicle body above a wheel of the vehicle; imaging the target with an image sensor to produce image data of the target; determining an initial spatial position of the target based on the image data of the target; comparing the initial spatial position of the target with a predetermined reference position; guiding a user to align the target to an adjusted spatial position using sensory perceptive stimuli when the initial spatial position differs from the reference position more than a threshold amount; and determining a value for the vehicle body parameter based on the corrected spatial position of the target.

Embodiments also include a method for measuring a parameter of a vehicle body, comprising attaching an optical target to the vehicle body; imaging the target with an image sensor to produce image data of the target; determining an initial spatial position of the target based on the image data of the target; determining a value for the vehicle body parameter based on the initial spatial position of the target; comparing the initial spatial position of the target with a predetermined reference position to determine a position error value representing a difference between the initial spatial position and the reference position; and mathematically correcting the determination of the value for the body parameter based on the position error value.

Embodiments can further include a system comprising an optical target attachable to a vehicle body above a wheel of the vehicle; an image sensor for viewing the target and capturing image data of the target; and a processor. The processor is adapted to receive and process the image data from the image sensor, determine an initial spatial position of the target based on the processed image data, compare the initial spatial position of the target with a predetermined reference position, guide a user to align the target to an adjusted spatial position using sensory perceptive stimuli when the initial spatial position differs from the reference position more than a threshold amount, and determine a value for a vehicle body parameter based on the corrected spatial position of the target.

Embodiments also include a system comprising an optical target attachable to a vehicle body, an image sensor for viewing the target and capturing image data of the target, and a processor. The processor is adapted to receive and process the image data from the image sensor, determine an initial spatial position of the target based on the processed image data, determine a value for the vehicle body parameter based on the initial spatial position of the target, compare the initial spatial position of the target with a predetermined reference position to determine a position error value representing a difference between the initial spatial position and the reference position, and mathematically correct the determination of the value for the body parameter based on the position error value.

Embodiments can further comprise an apparatus comprising a target, a body mount removably attachable to a vehicle body above a wheel of the vehicle, and an arm having a first end movably attached to the target and a second end movably attached to the body mount. A length of the arm between the first and second ends is adjustable. The body mount comprises a fine adjuster for changing a position of the second end of the arm relative to the body mount, to adjust an angular position of the target relative to the vehicle body when the body mount is attached to the vehicle body above the wheel of the vehicle and the length of the arm is set such that a predetermined portion of the target contacts a predetermined reference point of a wheel well of the vehicle body.

Advantages of embodiments of the disclosed subject matter will become apparent from the following description when considered in conjunction with the accompanying drawings.

BRIEF DESCRIPTION OF THE DRAWINGS

Embodiments will hereinafter be described in detail below with reference to the accompanying drawings, wherein like reference numerals represent like elements. The accompanying drawings have not necessarily been drawn to scale. Where applicable, some features may not be illustrated to assist in the description of underlying features.

DETAILED DESCRIPTION

Figure 1:
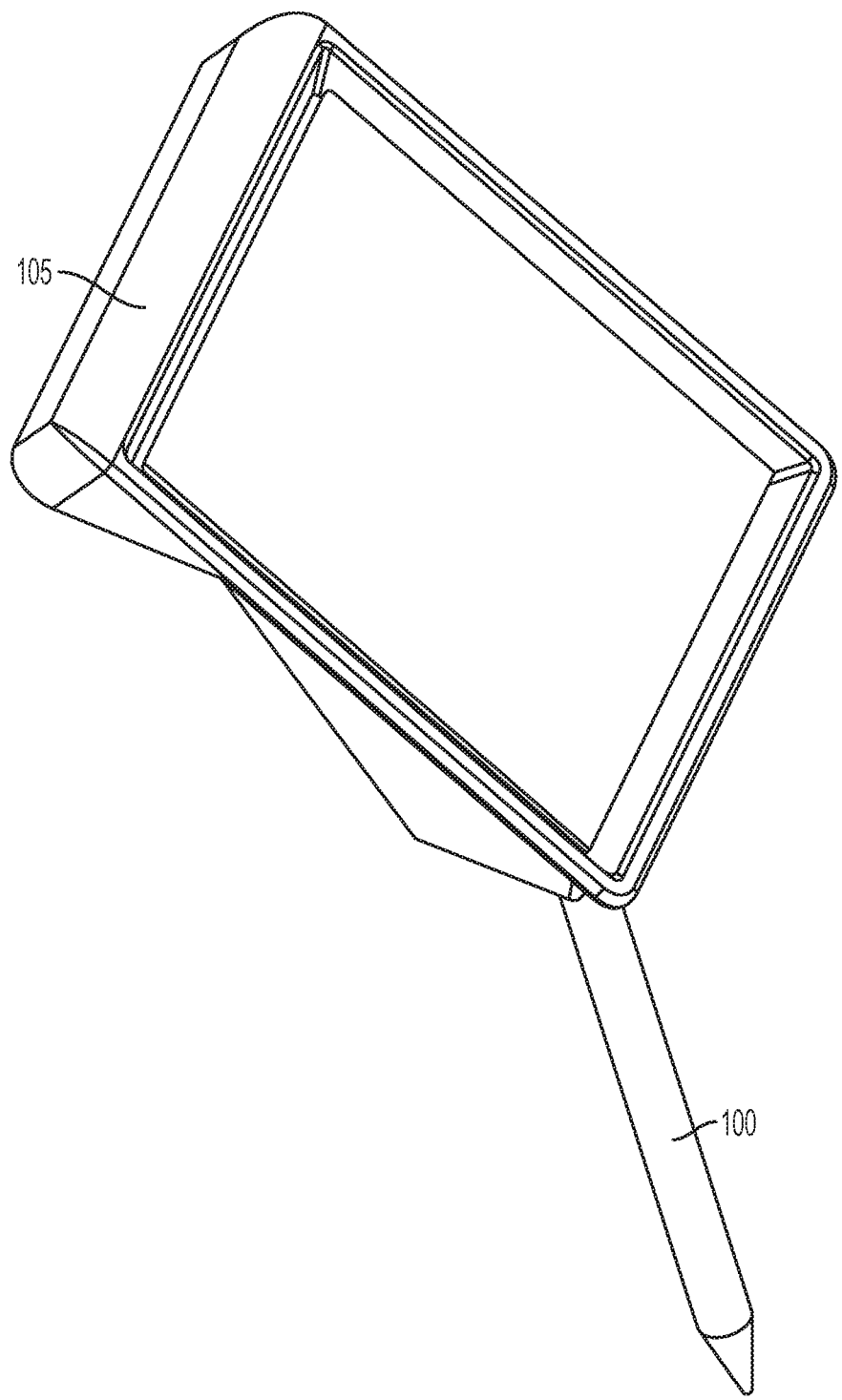
FIG. 1 illustrates a conventional target for measuring the ride height of a vehicle.

It should be understood that the principles described herein are not limited in application to the details of construction or the arrangement of components set forth in the following description or illustrated in the following drawings. The principles can be embodied in other embodiments and can be practiced or carried out in various ways. Also, it is to be understood that the phraseology and terminology used herein is for the purpose of description and should not be regarded as limiting.

Disclosed herein are methods and systems for aligning ride height targets and measuring ride height using the imagers and processor(s) of a visual aligner. The teachings herein improve over conventional alignment equipment by reducing the redundancy of manual measurements and simplifying the overall process for the end user. The disclosed methods can be implemented on a visual aligner discussed herein above having optical targets, image sensors, and a processor, such as described in U.S. Pat. Nos. 5,724,743; 5,809,658; 5,535,522; and 6,968,282.

In an exemplary embodiment, an active ride height target assembly for measuring the ride height of a vehicle attaches to the body of the vehicle; for example, over each of the four wheels of the vehicle, or onto the door sill between the front and rear wheels, using suction cups. The target must be adjusted with respect to the vehicle reference plane for accurate readings. Adjustments to the arm length of the target assembly are made via a telescoping arm, and an adjustable lead screw assembly raises and lowers the target. Because the adjustment to the reference plane is a tight tolerance, a fine adjust mechanism and a course adjust mechanism are provided. With a coarse adjustment alone, it would be too difficult to get the target aligned correctly, as it would be too easy to miss the tight tolerance required. With only a fine adjustment, it would take too long to adjust to the correct location, or the user would run out of adjustment range and have to re-attach the suction cups and start over.

Software associated with the alignment equipment dynamically reads the target and provides feedback to the user informing them of the state of adjustment of the target. Also, each target needs to be at a reference point on the vehicle body, such as the top of a vehicle wheel well. The aligner measures where the ride height target is placed with respect to the vehicle reference plane and the specific wheel over which it has been placed, and guides the user to position the target above (normal to the reference plane) the center of that wheel's position. This distance, and more importantly the angle, is verified throughout the process to make sure there is not a change beyond a predetermined tolerance. For example, if the suction cups slide, the target may tilt and give bad readings. The disclosed aligner measures this tilt and notifies the technician to re-adjust the target so the readings will be accurate. In certain embodiments, the aligner corrects for the tilt of the target and anticipates where the target would be if it was aligned with the vehicle plane, and displays the correct measurement based on its measured location and the correction based on its tilt.

According to a further aspect of the present disclosure, the technician attaches the ride height target over the wheel. The software associated with the alignment equipment dynamically reads the target and provides feedback to the user informing them of the state of adjustment of the target, based on where the ride height target is placed with respect to the vehicle reference plane and the specific wheel over which it has been placed, and guides the user to position the target approximately above the center of that wheel's position. Then, if the target is not perfectly adjusted but is positioned within a predetermined error range, the aligner corrects for the tilt of the target and anticipates where the target would be if it was perfectly aligned with the vehicle plane, and displays the correct measurement based on its measured location and the correction based on its tilt. Thus, the technician is prompted to adjust the target, but the technician does not need to perfectly adjust the target, and the aligner software compensates for the adjustment error.

According to a further aspect of the present disclosure, the technician attaches the ride height target over the wheel. The software associated with the alignment equipment dynamically reads the target and, if the target is not perfectly adjusted but is positioned within a predetermined error range (theoretically within a 90 degree range), the aligner corrects for the tilt of the target and anticipates where the target would be if it was perfectly aligned with the vehicle plane, and displays the correct measurement based on its measured location and the correction based on its tilt. Thus, the technician does not need to adjust the target, and the aligner software compensates for their initial placement error.

Another aspect of the present disclosure is an active ride height target assembly wherein the target assembly attaches to the body of a vehicle, such as over each of the four wheels of the vehicle, via magnets.

Another aspect of the present disclosure is an active ride height target assembly wherein the target assembly attaches to the body of a vehicle, e.g., over each of the four wheels of the vehicle, using a combination of suction cups and magnetic components.

Additional advantages and novel features will be set forth in part in the description which follows and in part will become apparent to those having ordinary skill in the art upon examination of the following and the accompanying drawings or may be learned from production or operation of the examples. The advantages of the present teachings may also be realized and attained by practice or use of the methodologies, instrumentalities and combinations particularly pointed out in the appended claims.

In the following detailed description, numerous specific details are set forth by way of examples in order to provide a thorough understanding of the relevant teachings. However, it should be apparent to those skilled in the art that the present teachings may be practiced without such details. In other instances, well known methods, and procedures have been described at a relatively high level, without detail, in order to avoid unnecessarily obscuring aspects of the present teachings.

The present teaching addresses and solves problems of redundant measurements, simplifying the alignment of a vehicle by eliminating the need for an operator to manually measure the ride height of the vehicle prior to beginning an alignment, and having again to measure the ride height of the vehicle after making alignment adjustments. This saves time and eliminates the redundancy. Allowing the operator to see live readings of the vehicle ride height as they make alignment adjustments streamlines the alignment process and is easier for the operator.

According to the present disclosure, an active ride height target is attached to a vehicle via suction cups and/or magnets. Attaching the active ride height target in this way allows the operator to leave it unattended and receive live readings via the alignment software.

Figure 2:
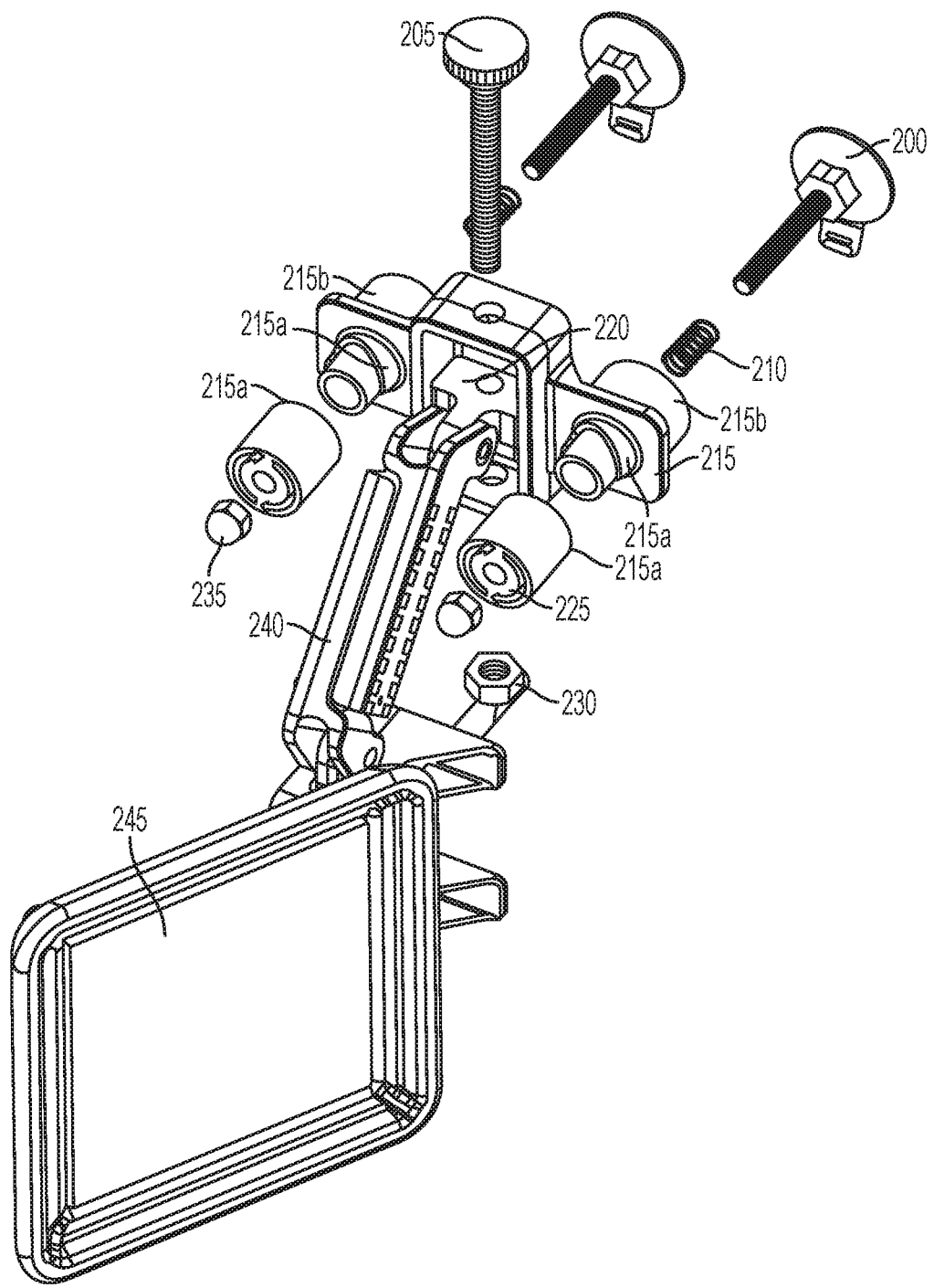
FIG. 2 is a partially exploded perspective view of an active ride height target according to an embodiment of the present disclosure.

The present subject matter will now be discussed in detail with reference to FIGS. 2-7. Note the targets 245, 300, 610, 700 each have fiducial marks (not shown) on their surface, such as circles or other shapes, similarly to conventional wheel targets used with visual aligners. FIG. 2 is an example a disclosed active ride height target utilizing suction cups for vehicle attachment. The partial exploded view allows explanation of the mechanism utilized for maximizing suction cup performance. The threaded stem of a suction cup 200 feeds through a spring 210, a housing 215, and a knob 225. A cam action mechanism 215a is incorporated in the housing 215 and into the knob 225 that allows tension to be applied to one of the suction cups 200 when its corresponding knob 225 is rotated. The housing 215 comprises; for example, molded plastic, and has a cylindrical housing 215b for each of the suction cups 200 to feed through. Cylindrical housings 215b hold the respective suction cups 200 in place and allow tension to be applied. When one of the knobs 225 locks in place, the result is increased suction from its associated suction cup 200 due to the elastic nature of the material comprising the suction cup. Turning a knob 225 further past the locking mechanism 215a releases the tension forces, and with the aid of spring 210 the suction cup 200 will pop past the cylindrical housing 215b of housing 215.

Figure 5:
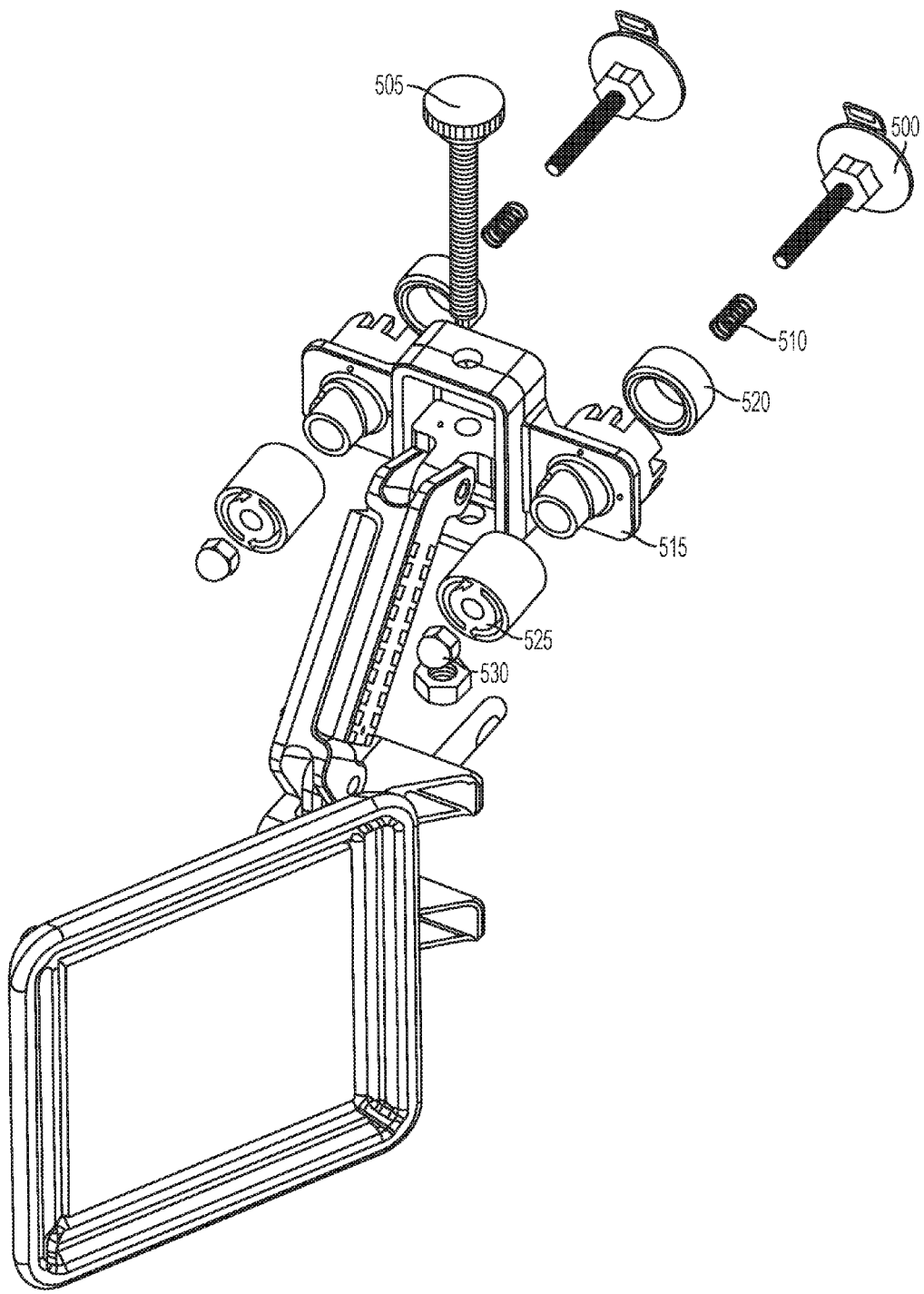
FIG. 5 is a partially exploded perspective view of an active ride height target according to a further embodiment of the present disclosure.

Another embodiment illustrating how an active ride height target assembly attaches to a vehicle is shown in FIG. 5. This example illustrates how both suction cups and magnets are used to secure the target assembly to the side of a vehicle. Suction cups 500, springs 510, molded housing 515, and knobs 525 are utilized in the same manner as in the embodiment of FIG. 2. Additionally, a pair of magnets 520 provide additional pull force against the vehicle. Each magnet 520 pops into and is retained by the molded housing 515. Initializing the cam mechanism by turning the pull knobs 525 pulls the molded housing 515 and magnets 520 closer to the vehicle body, thus providing more pull than a suction cup alone. Releasing the suction mechanism causes molded housing 515 to spring away from the vehicle, thus depleting the magnetic pull on the vehicle.

Figure 4:
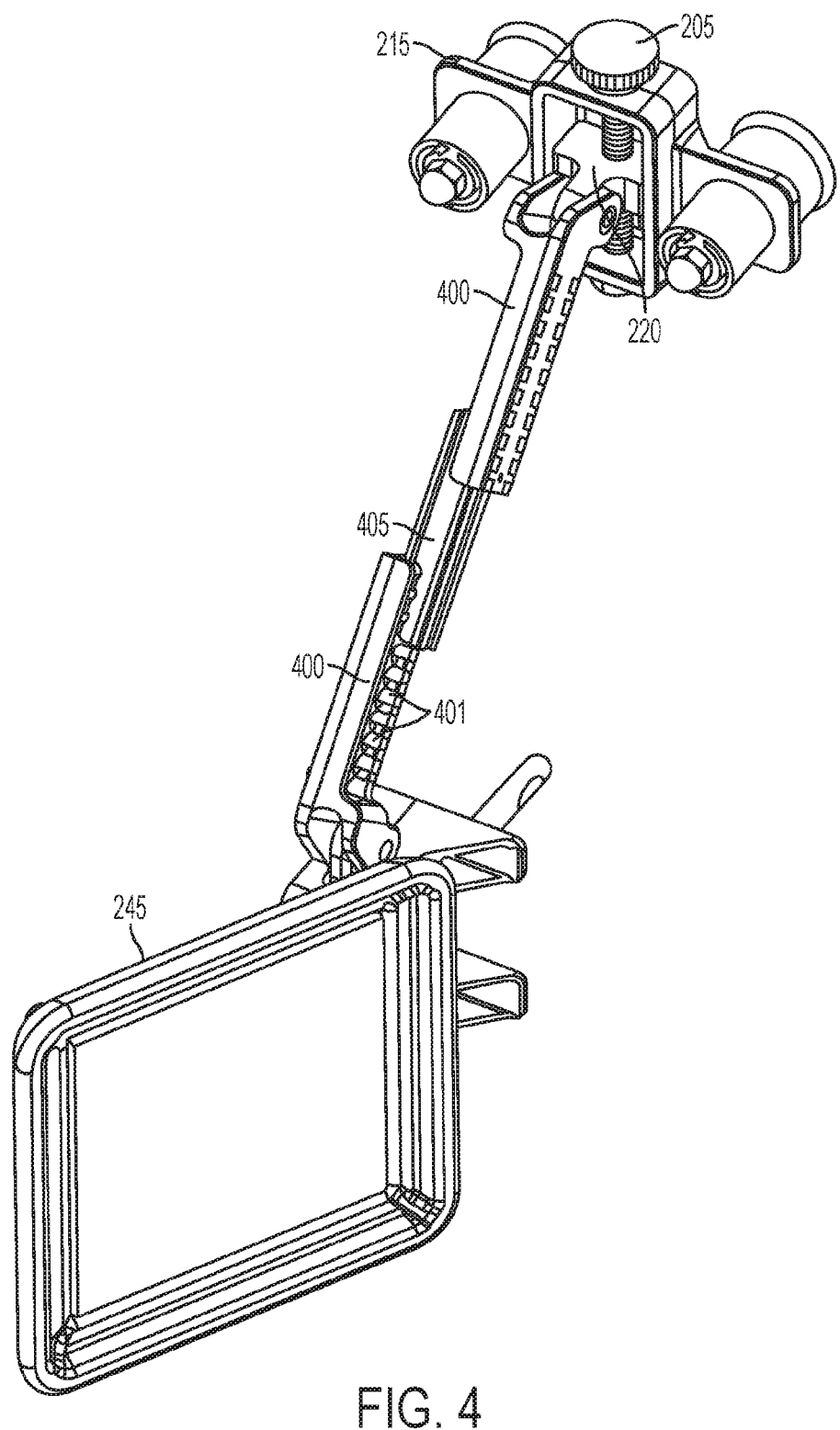
FIG. 4 is a perspective view of the active ride height target of FIG. 2 with its sliding adjustment in the fully extended position.

Once attached to a vehicle via one of the techniques outlined herein above, the assembly must be adjusted to align the target with the vehicle reference plane. The importance of this will be discussed below. There are two types of adjusters for adjusting the ride height assembly: a coarse adjuster and a fine adjuster. The coarse adjustment is typically made prior to installing a ride height target onto a vehicle. Referring now to FIG. 4, two arms 400 slide along a block 405 in a ratchet-like motion. This coarse adjustment mechanism relies on ball plungers embedded in block 405 that remain under constant pressure against the arms 400. Molded-in dimples 401 in arms 400 allow the ball to exert pressure in locations that will allow arms 400 to remain in one of numerous extended/contracted positions. Those of skill in the art will appreciate this can also be accomplished with locking thumb nuts or similar well-known mechanisms. A distal end of one of the arms 400 is movably attached to the target 245, and a distal end of the other arm 400 is movably attached to the adjustment block 220 of the molded housing 215, as explained immediately below.

A fine adjustment is made once the ride height target is installed on the vehicle. Referring again to FIG. 2, the disclosed fine adjustment mechanism allows for fine tuning of the angular position of the target 245 via the turning of a lead screw 205. Turning the screw 205 causes the adjustment block 220 to move up and down the screw 205. Adjustment block 220 is threaded and can only travel vertically along the screw 205 due to the space restrictions implemented by the molded housing 215. Adjustments are made until feedback from the alignment software alerts the operator that the assembly is aligned.

The disclosed ride height target assembly can be placed at any predetermined reference point on the vehicle body to measure ride height. For example, they can be sized to be attached above the wheel wells, or on the door sills (i.e., the "rail" under the door between the front and rear wheels). The industry now appears to be standardizing placement of ride height targets above the wheel wells. Therefore, the embodiments described herein below refer to placement of the target assemblies above the wheel wells, and measurement of ride height with reference thereto. However, it should be understood that the disclosed systems and methods are also applicable when the ride height is measured to vehicle body reference points other than the top of the wheel wells.

Figure 3:
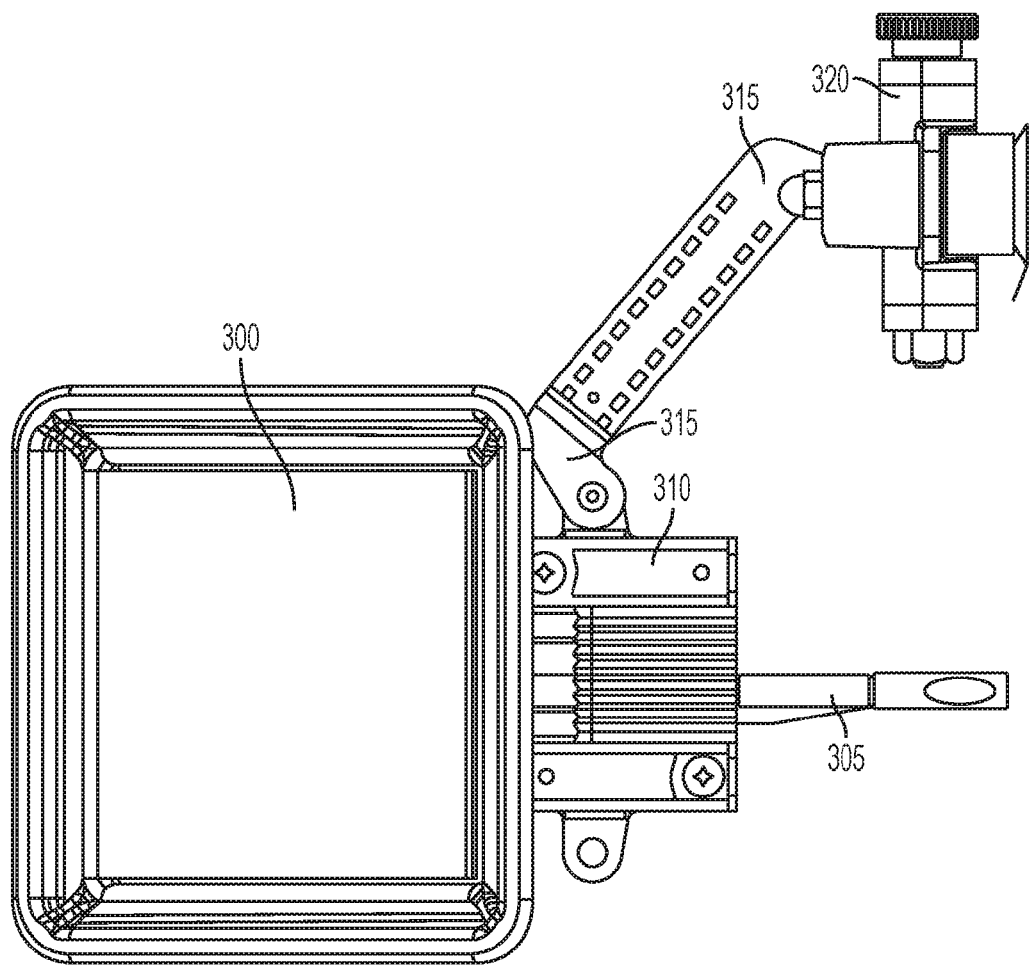
FIG. 3 is a side view of the active ride height target of FIG. 2.

FIG. 3 will now be used to explain the importance of aligning the target assembly prior to use. When a ride height target assembly of an exemplary embodiment is correctly attached above the wheel well of a vehicle, the top of a locator 305 touches the underside of a vehicle wheel well. This is a common location to measure the ride height of a vehicle. The top of locator 305 also passes through the center of a target (not shown) that would mount onto the target housing 300. When the target assembly is aligned with the vehicle reference plane, the locator 305 is typically touching the underside of the vehicle wheel well. This translates into knowing that the center of the target is also passing along the underside of the vehicle wheel well. To accommodate a variety of vehicle types and wheel well sizes, the locator 305 can be extended or retracted into position.

Figure 6:
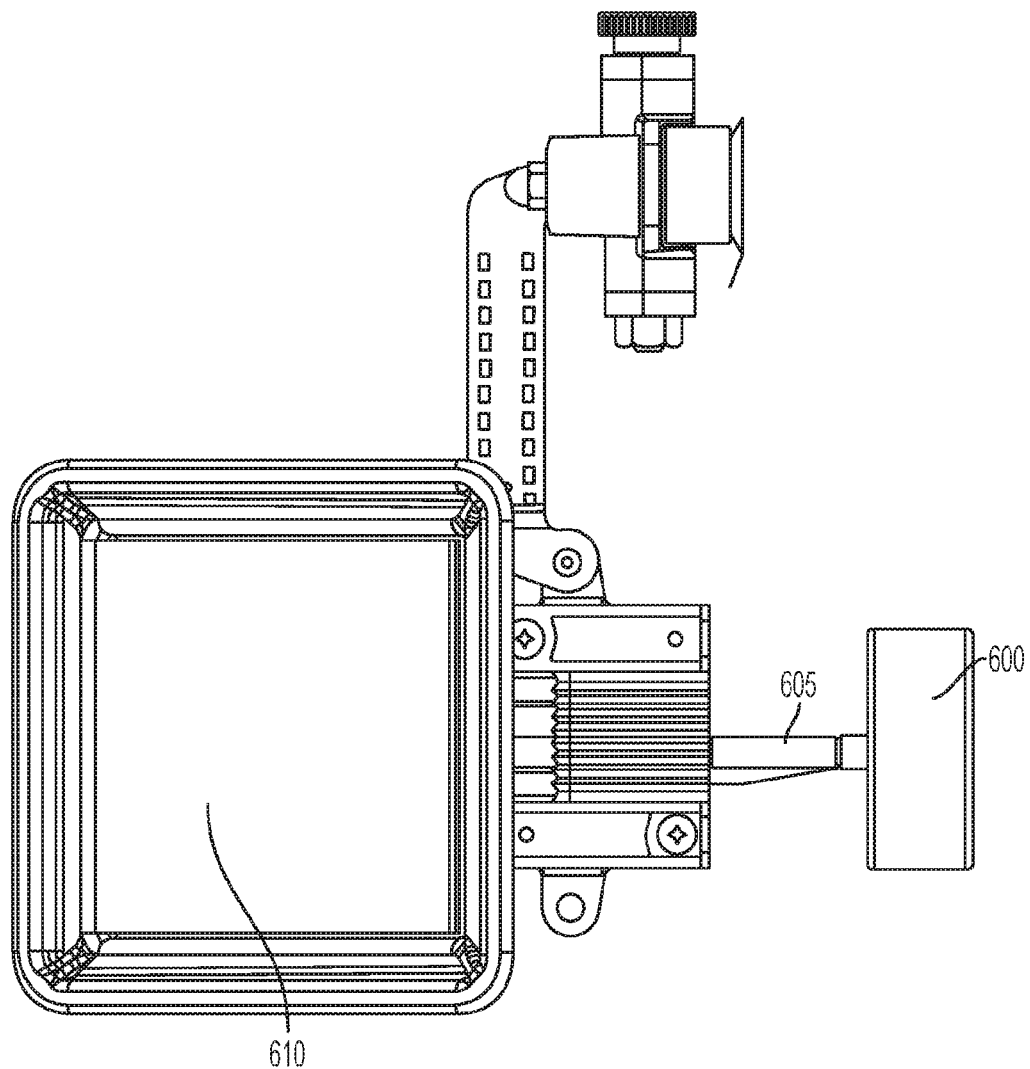
FIG. 6 illustrates an active ride height target according to an embodiment of the present disclosure utilizing an accessory to measure recessed measure points in a vehicle wheel well.
Figure 7:
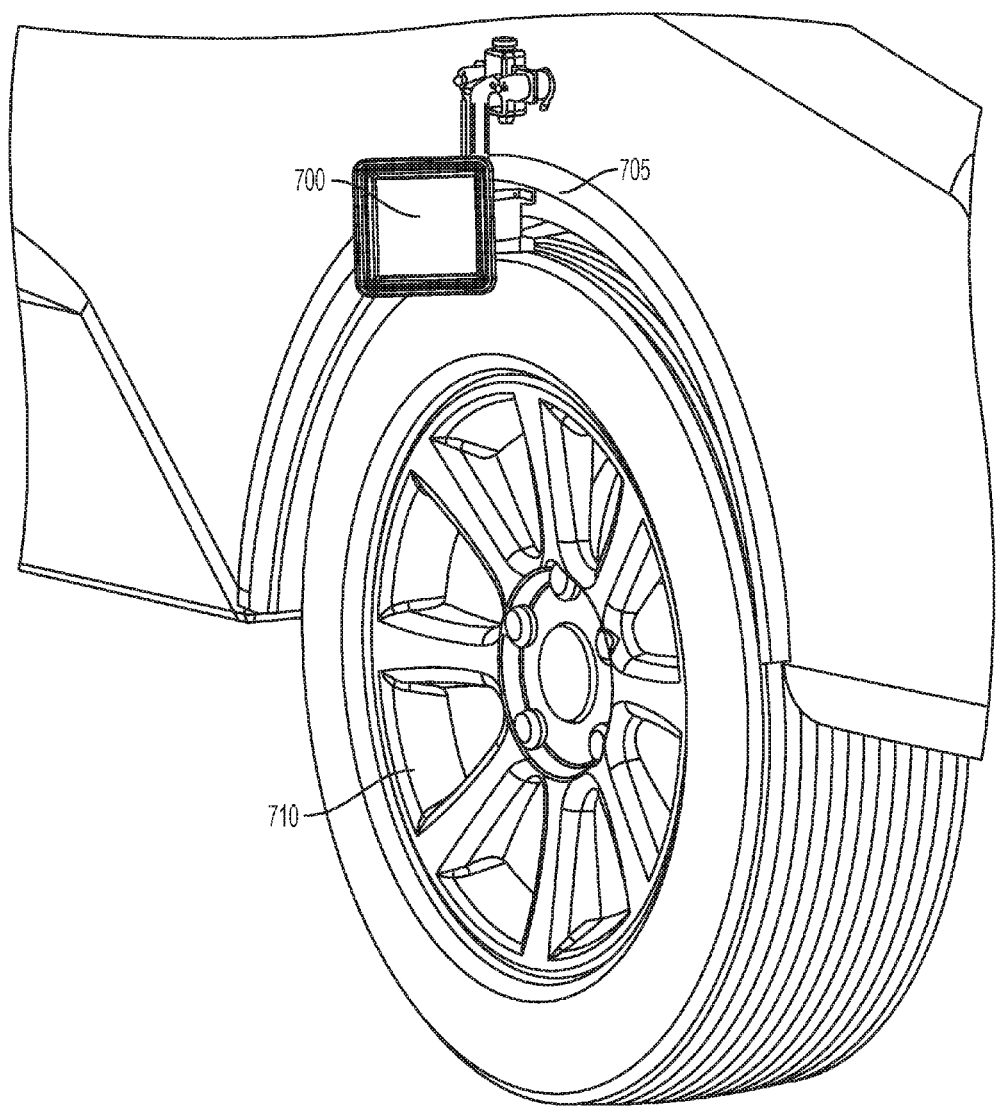
FIG. 7 illustrates an active ride height target according to an embodiment of the present disclosure attached to a vehicle wheel well.

Some vehicles have ride height measurement points that are retracted up into the wheel well. For these vehicles, a locator 305 alone will not suffice in obtaining a correct measurement. These vehicles require an additional part to reach up to the measurement point. FIG. 6 illustrates an example of how a recessed measurement point is reached using a detachable accessory with an active ride height target according to the disclosure. In this embodiment, a ring 600 slides onto locator 605. The thickness of the ring 600 is known and is used by the alignment software to adjust the ride height measurement considering the location of the top of the locator 605 and the thickness of the ring 600. FIG. 7 shows a target 700, which could be any of the targets shown in FIGS. 2-6, in position on a vehicle body above a vehicle wheel 710 and contacting a wheel well 705.

Figure 8:
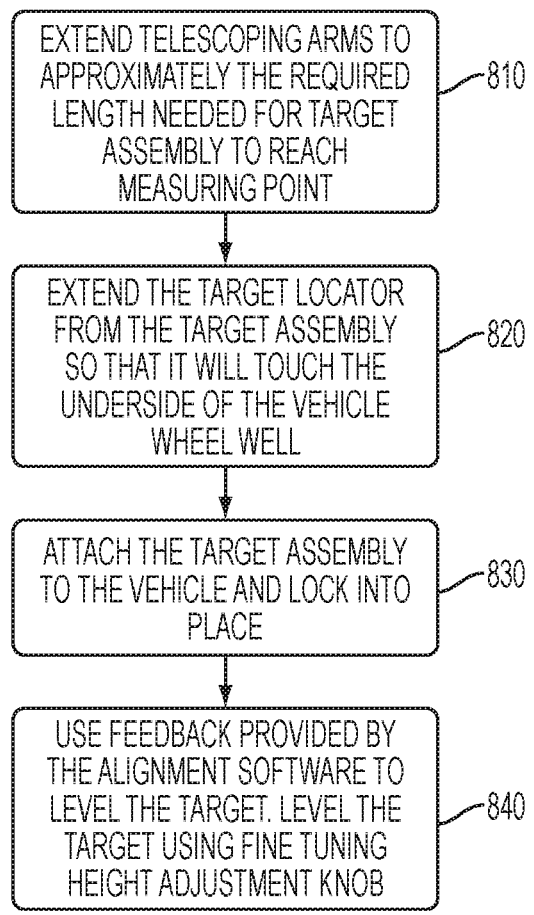
FIG. 8 is a flow chart of a method of aligning a ride height target according to the present disclosure.

Referring now to the flow chart of FIG. 8, to begin the process of measuring ride height, a user extends the telescoping arms of the target assembly to about the length needed for the target assembly to reach the measuring point (step 810). The target locator (e.g., ref num. 315) is then extended from the target assembly so that it will touch the underside of the vehicle wheel well (step 820). The target assembly is then attached to the vehicle body, approximately at the top of the wheel well, and locked into place, as shown in FIG. 7 (step 830). The software of the visual alignment system is thereafter used to guide the user in aligning the target, using the fine adjustment mechanism, and/or to automatically compensate for an error in positioning the target (step 840).

Figure 10A:
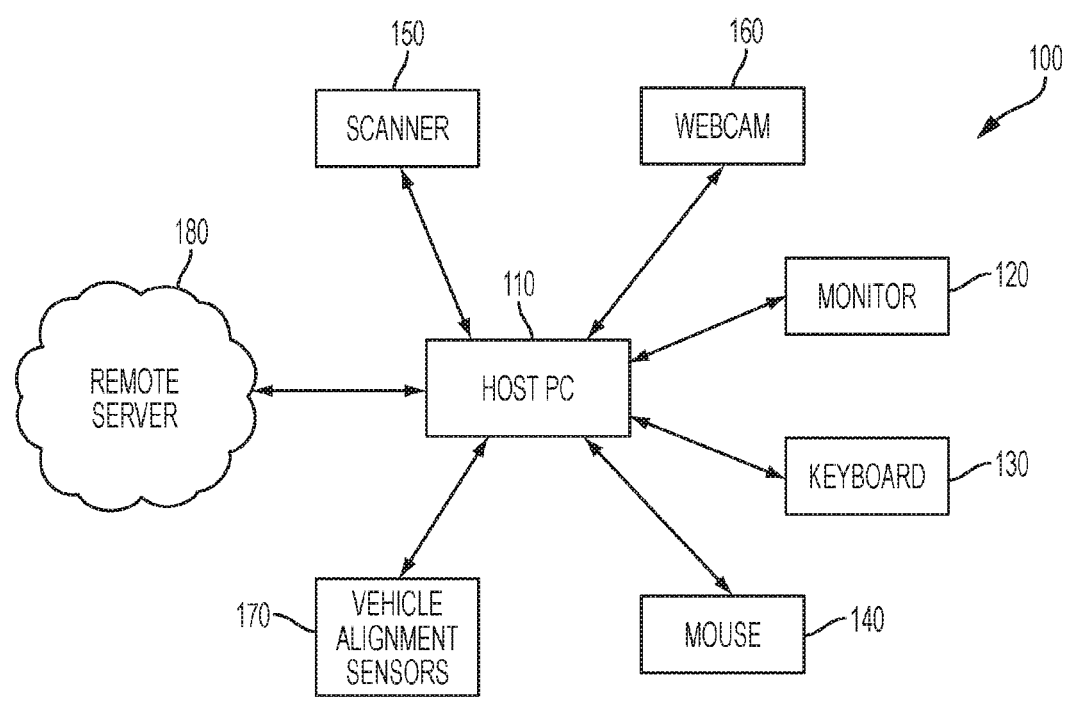
FIG. 10a depicts an exemplary architecture of a system in which the disclosed methodology and graphical user interface are implemented.

FIG. 10a is an exemplary architecture of a system 100 that is an environment for implementing the functionality and user interface of the present disclosure. In system 100, a host computer, such as a commercially available personal computer (PC) 110, is connected to conventional input and output devices such as monitor 120, keyboard 130, mouse 140, scanner 150, and webcam 160. Monitor 120 is a conventional monitor, or a conventional touch screen for accepting user input. PC 110 is further connected to vehicle alignment sensors 170 of a vehicle wheel alignment system as discussed in the "Background" section herein above. A conventional remote server 180 is also connected to host PC 110. Server 180 provides content from various databases described herein to PC 110. Such content is either stored at server 180, or obtained via the Internet or another remote data network. PC 110 can also send data to server 180; for example, to update certain databases stored at server 180. Those of skill in the art will understand that the functionality and user interface of this disclosure can be implemented in software in a conventional manner, such as by modifying the software of a machine vision alignment system described in the Background section above.

The target is imaged with an image sensor (e.g., a camera) of the visual alignment system to produce image data of the target. The processor of the visual aligner determines an initial spatial position of the target based on the image data of the target in a conventional manner. It then compares the initial spatial position of the target with a predetermined reference position, such as a previously-determined reference plane of the vehicle (i.e., determined by conventional techniques using the wheel targets and cameras of the alignment system).

In some embodiments, the reference plane is the "rack plane" measured from the bottom of the vehicle's tires. In other embodiments, the reference plane is a "base plane" such as a front base plane containing the wheel spindle points of the two front wheels of the vehicle and a third point midway between the spindle points of the vehicle's rear wheels. The spindle point of a wheel is defined as where the wheel's axis of rotation passes through a vertical plane of the wheel where the claws of a wheel target's clamp attach to the wheel. The calculation of these reference planes is well-known in the art.

The aligner's camera views the target substantially along a longitudinal axis of the vehicle body, and the target is attached to the vehicle body substantially normal to the longitudinal axis of the body. In certain embodiments, the comparison of the initial spatial position of the target with the predetermined reference position comprises comparing an angular orientation of the target to the (substantially horizontal) vehicle reference plane. The angular orientation of the target refers to the orientation of an axis of the target that is substantially normal to the longitudinal axis of the body (e.g., an axis drawn through locator 305), and the orientation of a target axis that is substantially parallel to the longitudinal axis of the body (e.g., an axis perpendicular to the axis of locator 305). More particularly, the correct spatial position of the target is directly above the center of a wheel, and normal to the reference plane.

Figure 9:
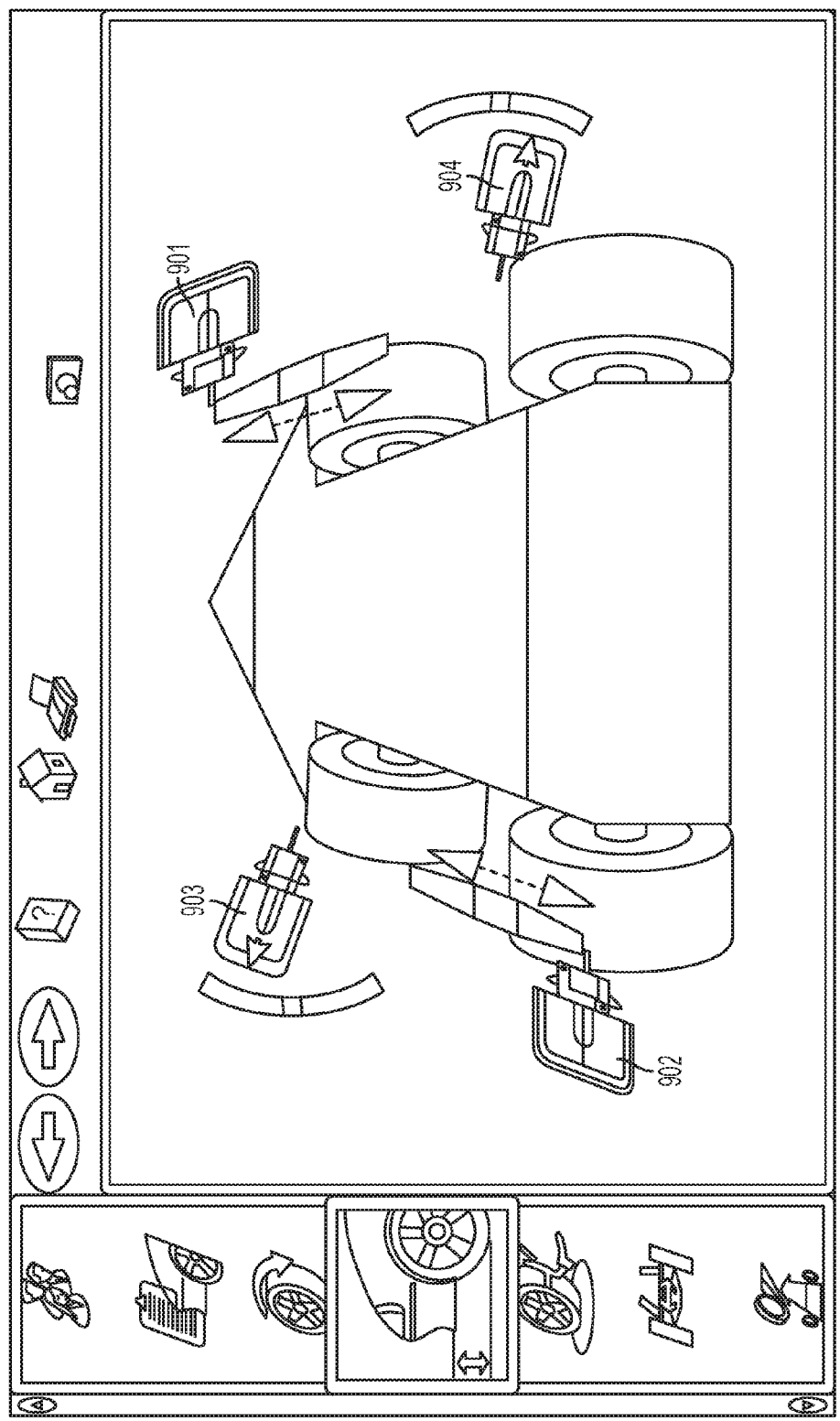
FIG. 9 is a screen shot of a graphical user interface associated with methods and systems of the present disclosure.

In certain embodiments, the target is aligned by the user to an adjusted spatial position when the initial spatial position differs from the correct position more than a threshold amount, by prompts (i.e., sensory perceptive stimuli) from the aligner's processor. Such prompts can include visual prompts as shown on a monitor as in FIG. 9, and/or audible prompts. The prompts can include quantitative information regarding the mis-positioning of the target. The disclosed display screen implements this functionality as follows, using a well-known software tool such as Visual Studio 2008, XAML, WPF, or C#. Other conventional toolkits (i.e., development environments) may be used to achieve similar effects.

If the processor determines using image data that the target assembly is not mounted at the top of the wheel well (i.e., directly above the wheel center), it will graphically indicate the direction and extent the target mount (e.g., suction cups and/or magnets) must be moved. See, right front target 901 and left rear target 902 in FIG. 9. If the processor determines that the axis of the target that goes through the locator 305 is not parallel to the vehicle reference plane, it will graphically indicate the direction and extent the target must be moved up or down (via the fine adjustment mechanism) to be properly aligned. See, left front target 903 and right rear target 904 in FIG. 9. This procedure is performed for all four ride height targets 901-904.

After the target is moved to the adjusted position, the processor determines the ride height in a conventional manner; for example, by comparing the center of the target to the base plane. The user can then perform a wheel alignment in a conventional manner, using the visual aligner system.

The processor of the aligner periodically receives and processes current image data of the target from the camera, enabling it to calculate a current spatial position of the target (also referred to as "initial spatial position") based on the image data, compare the current spatial position of the target with the adjusted spatial position (e.g., by comparing the angular orientation of the target to the vehicle reference plane), and inform the user when the comparison indicates the target has moved more than a threshold distance from the adjusted spatial position. Thus, the processor continuously measures an angular position of the target center relative to the reference plane, to determine the extent to which the target is not aligned in parallel with the reference plane. In certain embodiments, the threshold is when the target has moved more than 1 mm out of alignment. The processor then warns the user that the target has moved, and that the user should re-align the target. The processor can perform this measurement continuously during the wheel alignment procedure.

Figure 11:
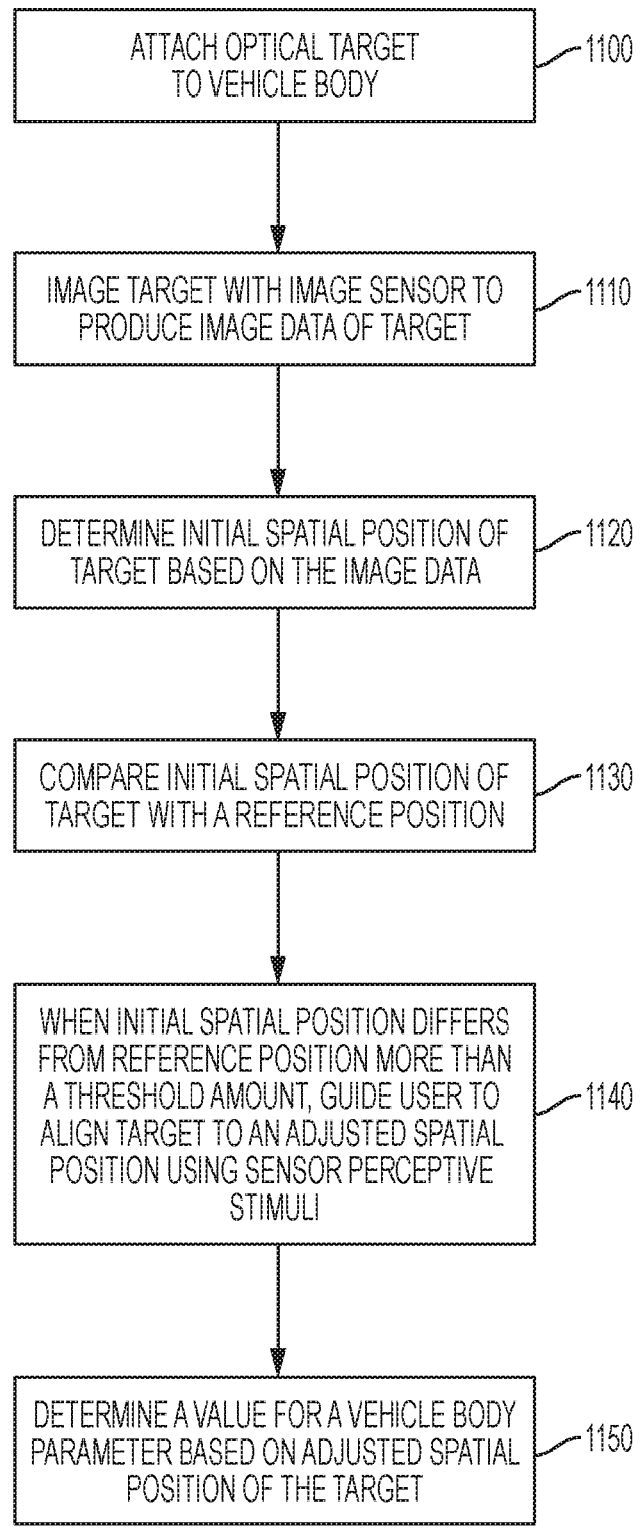
FIG. 11 is a flow chart of a method of aligning a ride height target according to the present disclosure.

This procedure is illustrated in the flow chart of FIG. 11. An optical target, such as a ride height target described herein above, is attached to a vehicle body (step 1100). An image sensor (e.g., a camera) views the target and captures image data of the target (step 1110). The processor processes the image data and then determines an initial spatial position of the target based on the processed image data (step 1120). The processor also compares the initial spatial position of the target with a predetermined reference position (step 1130), and guides a user to align the target to an adjusted spatial position using sensory perceptive stimuli (e.g., the prompts of the monitor of FIG. 9) when the initial spatial position differs from the reference position more than a threshold amount (step 1140). The system processor then determines a value for a vehicle body parameter, such as vehicle ride height, based on the adjusted spatial position of the target (step 1150).

In some embodiments, an "auto correction" feature is provided; for example, when the target moves less than a threshold distance from the adjusted spatial position prior to completion of the wheel alignment procedure, the processor is adapted to automatically correct the determination of the value for the vehicle body parameter based on the movement of the target. The threshold distance could be the "warning threshold" discussed immediately above. Those skilled in the art will appreciate that the processor can automatically compensate (or "correct") for a small amount of misalignment via its programming, based on its knowledge of where the target should be located and where it's currently located, and can calculate a difference between the two positions. This is an example of "mathematical correction" referred to herein below.

Figure 12:
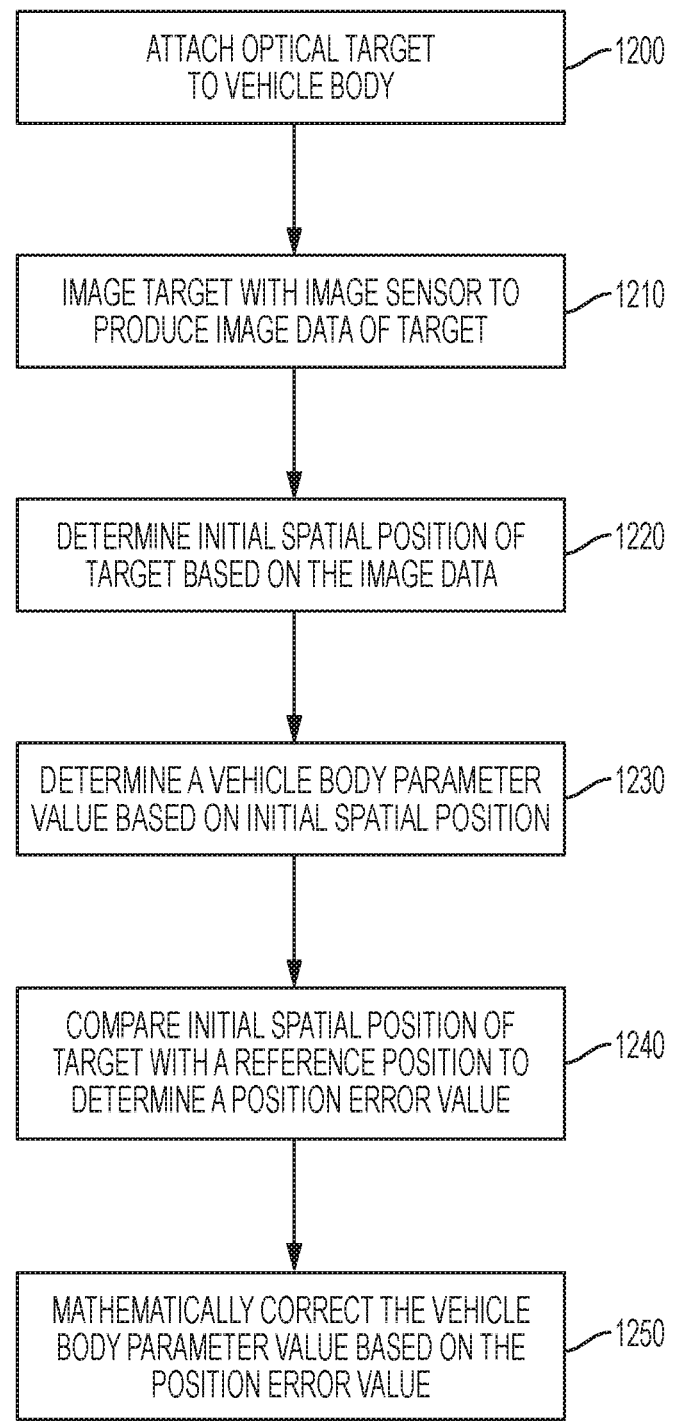
FIG. 12 is a flow chart of a method of compensating for variance in the position of a ride height target according to the present disclosure.

This procedure is illustrated in the flow chart of FIG. 12. An optical target is attached to a vehicle body (step 1200). An image sensor (e.g., a camera) views the target and captures image data of the target (step 1210). The processor processes the image data and then determines an initial spatial position of the target based on the processed image data (step 1220), and determines a value for a vehicle body parameter based on the initial spatial position of the target (step 1230). The processor also compares the initial spatial position of the target with a predetermined reference position to determine a position error value representing a difference between the initial spatial position and the reference position (step 1240), and mathematically corrects the determination of the body parameter value based on the position error value (step 1250).

In certain embodiments, the computer-prompted manual correction procedure described above with reference to FIG. 11 is combined with the auto correction feature so that the user does not need to manually correct the target position perfectly. According to these embodiments, the technician attaches the ride height target over the wheel, such as shown in FIG. 7. The software associated with the alignment equipment dynamically reads the target as disclosed herein above, and provides feedback to the user informing them of the state of adjustment of the target, based on where the ride height target is placed with respect to the vehicle reference plane and the specific wheel over which it has been placed. If the initial position of the target differs from a reference position (i.e., parallel to the reference plane) more than a threshold amount, the software guides the user to position the target approximately above the center of that wheel's position within a predetermined error range. The aligner then mathematically corrects for the position error (i.e., tilt) of the target and automatically corrects the determination of the value for the vehicle body parameter as discussed immediately above. Thus, the technician is prompted to adjust the target, but the technician does not need to perfectly adjust the target, and the aligner software compensates for a target position error remaining after the adjustment.

Figure 13:
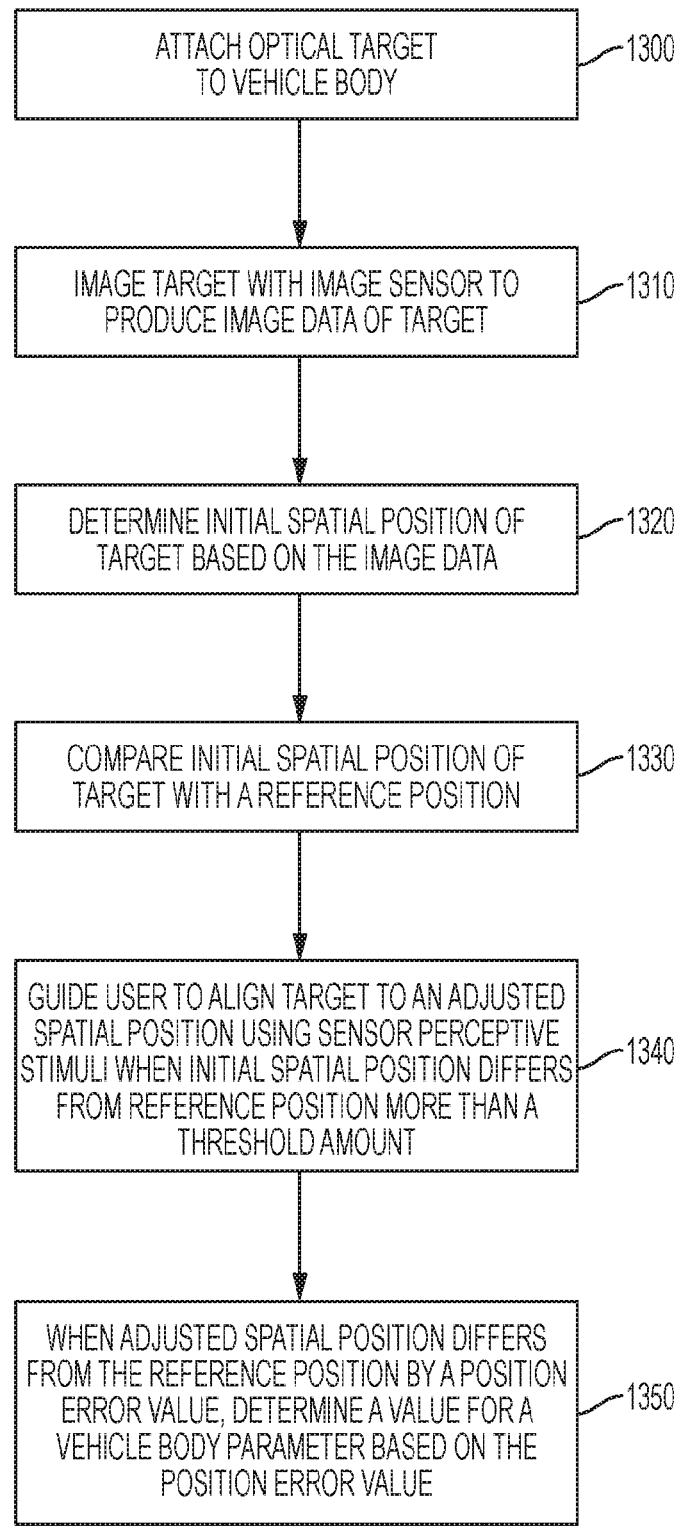
FIG. 13 is a flow chart of a method of aligning a ride height target and compensating for variance in the position of the ride height target according to the present disclosure.

This procedure is illustrated in the flow chart of FIG. 13. An optical target is attached to a vehicle body (step 1300). An image sensor (e.g., a camera) views the target and captures image data of the target (step 1310). The processor processes the image data and then determines an initial spatial position of the target based on the processed image data (step 1320). The processor also compares the initial spatial position of the target with a predetermined reference position (step 1330), and guides a user to align the target to an adjusted spatial position using sensory perceptive stimuli (e.g., the prompts of the monitor of FIG. 9) when the initial spatial position differs from the reference position more than a threshold amount (step 1340). When the adjusted spatial position differs from the reference position by a position error value, the system processor mathematically corrects the determination of the body parameter value based on the position error value (step 1350).

The computer-prompted manual correction procedure does not need to be employed if the initial position of the ride height target is within a range of correction. In this case, the auto correction feature (e.g., of FIG. 12) alone can be used, so that the user does not need to manually adjust the target position. According to such embodiments, the technician attaches the ride height target over the wheel, such as shown in FIG. 7. The software associated with the alignment equipment dynamically reads the target as disclosed herein above, and if the target is positioned within a predetermined error range (which theoretically can be within a 90 degree range), the aligner then mathematically corrects for the position error (i.e., tilt) of the target and automatically corrects the determination of the value for the vehicle body parameter as discussed herein above. Thus, the technician does not need to adjust the target, because the aligner software compensates for error in the initial positioning of the target.

Referring again to FIG. 3, in certain embodiments the disclosed ride height target assembly includes an electronic level sensor 310, connected wirelessly or in a wired manner to the aligner's computer. Level sensor 310 can be a commercially available conventional electronic level sensor. In these embodiments, instead of using the aligner's cameras to determine all of the measurements of the target to the spatial measurement system, the electronic level is used to measure the levelness of the target throughout the alignment procedure, while the cameras are used to measure only the height of the target. In other words, the software of the aligner's processor employs a reading from the electronic level in combination with a ride height value calculated using the spatial position of the ride height target to inform the operator of, or automatically correct for, non-optimal target positioning. Thus, the disclosed target assembly with electronic level sensor can be used to implement any of the above-described embodiments. Likewise, readings from other position measurement sensors can be used in combination with the spatial position of the target.

As discussed herein above, disclosure regarding well-known measurement techniques based on processing of images of targets is found in U.S. Pat. No. 5,724,743 to Jackson, as well as in U.S. Pat. Nos. 5,943,783; 5,535,522; and 6,148,528 to Jackson, and U.S. Pat. No. 5,809,658 to Jackson et al., the entirety of each of which is hereby incorporated by reference herein.

Computer hardware platforms may be used as the hardware platform(s) for one or more of the user interface elements described herein. The hardware elements, operating systems and programming languages of such computers are conventional in nature, and it is presumed that those skilled in the art are adequately familiar therewith to adapt those technologies to implement the graphical user interface essentially as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 10B:
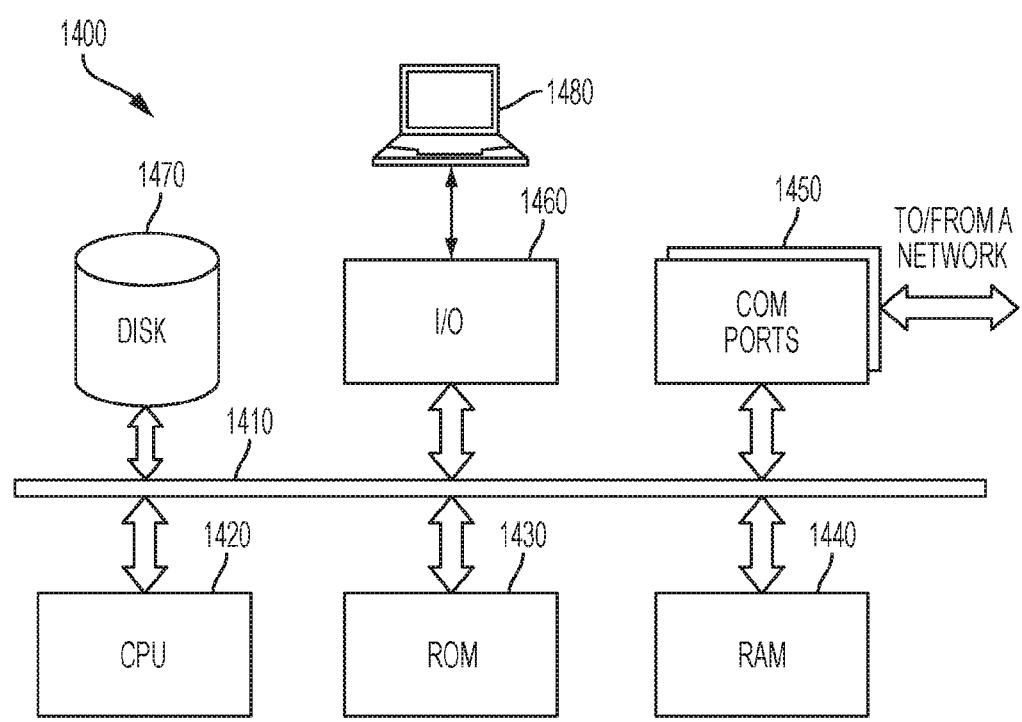
FIG. 10b depicts a general computer architecture on which the present disclosure can be implemented.

FIG. 10b provides a functional block diagram illustration of a computer hardware platform which includes user interface elements. The computer may be a general purpose computer or a special purpose computer. This computer 1400 can be used to perform the calculations as described herein, and implement any components of the graphical user interface as described herein. For example, the software tools for generating the alignment indicators, icons, etc. of FIG. 9 can all be implemented on a computer such as computer 1400, via its hardware, software program, firmware, or a combination thereof. Although only one such computer is shown, for convenience, the computer functions relating to processing of the disclosed calculations and user interface may be implemented in a distributed fashion on a number of similar platforms, to distribute the processing load.

The computer 1400, for example, includes COM ports 1450 connected to and from a network connected thereto to facilitate data communications. The computer 1400 also includes a central processing unit (CPU) 1420, in the form of one or more processors, for executing program instructions. The exemplary computer platform includes an internal communication bus 1410, program storage and data storage of different forms, e.g., disk 1470, read only memory (ROM) 1430, or random access memory (RAM) 1440, for various data files to be processed and/or communicated by the computer, as well as possibly program instructions to be executed by the CPU. The computer 1400 also includes an I/O component 1460, supporting input/output flows between the computer and other components therein such as user interface elements 1480. The computer 1400 may also receive programming and data via network communications.

Hence, aspects of the methods of making the disclosed calculations and generating the disclosed graphical user interface, e.g., calculation of ride height target alignment and display of target alignment, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on a PC or server. In addition, the user interface and its components as disclosed herein can be implemented as a firmware, firmware/software combination, firmware/hardware combination, or a hardware/firmware/software combination.

The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present teachings. However, it should be recognized that the present teachings can be practiced without resorting to the details specifically set forth. In other instances, well known processing structures have not been described in detail, in order not to unnecessarily obscure aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for measuring a parameter of a vehicle body, the method comprising:
   attaching an optical target to the vehicle body;
   imaging the target with an image sensor to produce image data of the target;
   determining an initial spatial position of the target based on the image data of the target;
   determining a value for the vehicle body parameter based on the initial spatial position of the target;
   comparing the initial spatial position of the target with a predetermined reference position for the target to determine a position error value representing a difference between the initial spatial position and the reference position; and
   mathematically correcting the determination of the value for the body parameter based on the position error value.

2. The method of claim 1, wherein the position error value is within a predetermined error range.

3. The method of claim 1, comprising attaching the optical target to the vehicle body above a wheel of the vehicle.

4. The method of claim 1, wherein the image sensor views the target substantially along a longitudinal axis of the vehicle body, and the target is attached to the vehicle body substantially normal to the longitudinal axis of the body; and
   wherein comparing the initial spatial position of the target with the predetermined reference position for the target comprises comparing an angular orientation of the target to a substantially horizontal vehicle reference plane.

5. The method of claim 4, wherein the angular orientation of the target comprises at least one of the orientation of a target axis that is substantially normal to the longitudinal axis of the body, and the orientation of a target axis that is substantially parallel to the longitudinal axis of the body.

6. The method of claim 4, wherein the vehicle body parameter is a ride height of the vehicle, and determining a value for the vehicle ride height comprises determining a distance between the vehicle reference plane and the initial or adjusted spatial position of the target.

7. The method of claim 1, comprising attaching the target to the vehicle body such that a predetermined portion of the target contacts a predetermined reference point of a wheel well of the vehicle body.

8. The method of claim 1, comprising performing a wheel alignment procedure on the vehicle; and
   informing a user when the target moves more than a threshold distance from the initial spatial position or an adjusted spatial position prior to completion of the wheel alignment procedure.

9. The method of claim 8, wherein when the target moves less than the threshold distance from the initial spatial position or the adjusted spatial position prior to completion of the wheel alignment procedure, the method comprises automatically correcting the determination of the value for the vehicle body parameter based on the movement of the target.

10. The method of claim 1, comprising:
    determining an orientation of the optical target using a level gauge attached to the optical target; and determining the initial spatial position of the target based on the orientation of the target and the image data.

11. The method of claim 10, comprising:
    performing a wheel alignment procedure on the vehicle;
    determining the target has moved more than a predetermined distance from the initial spatial position or the adjusted spatial position based on the orientation of the target and the image data; and
    when the target moves more than the predetermined distance prior to completion of the wheel alignment procedure, automatically correcting the determination of the value for the vehicle body parameter based on the movement of the target.

12. A system comprising:
    an optical target attachable to a vehicle body;
    an image sensor for viewing the target and capturing image data of the target; and a processor adapted to:
    receive and process the image data from the image sensor,
    determine an initial spatial position of the target based on the processed image data,
    compare the initial spatial position of the target with a predetermined reference position for the target,
    guide a user to align the target to an adjusted spatial position using sensory perceptive stimuli when the initial spatial position differs from the reference position more than a threshold amount, and
    determine a value for a vehicle body parameter based on the adjusted spatial position of the target.

13. The system of claim 12, wherein the adjusted spatial position differs from the reference position by a position error value; and
  wherein the processor is adapted to mathematically correct the determination of the value for the body parameter based on the position error value.

14. The system of claim 13, wherein the position error value is within a predetermined error range.

15. The system of claim 12, wherein the processor is adapted to guide the user to align the target by providing the user at least one of a visual prompt via a monitor and an audible prompt via a speaker, the prompt having quantitative positioning information.

16. A system comprising:
  an optical target attachable to a vehicle body;
  an image sensor for viewing the target and capturing image data of the target; and a processor adapted to:
  receive and process the image data from the image sensor,
  determine an initial spatial position of the target based on the processed image data,
  determine a value for the vehicle body parameter based on the initial spatial position of the target,
  compare the initial spatial position of the target with a predetermined reference position for the target to determine a position error value representing a difference between the initial spatial position and the reference position, and
  mathematically correct the determination of the value for the body parameter based on the position error value.

17. The system of claim 16, wherein the position error value is within a predetermined error range.

18. The system of claim 16, wherein the optical target is attachable to the vehicle body above a wheel of the vehicle.

19. The system of claim 16, wherein the image sensor is for viewing the target substantially along a longitudinal axis of the vehicle body;
  wherein the target is attachable to the vehicle body substantially normal to the longitudinal axis of the body; and
  wherein the processor is adapted to compare the initial spatial position of the target with the predetermined reference position for the target by comparing an angular orientation of the target to a substantially horizontal vehicle reference plane.

20. The system of claim 19, wherein the angular orientation of the target comprises at least one of the orientation of a target axis that is substantially normal to the longitudinal axis of the body, and the orientation of a target axis that is substantially parallel to the longitudinal axis of the body.

* * * * *